July 25, 1967     M. C. HENDERSON     3,333,147
LINE DRAWING SYSTEM
Filed July 31, 1963     3 Sheets-Sheet 1
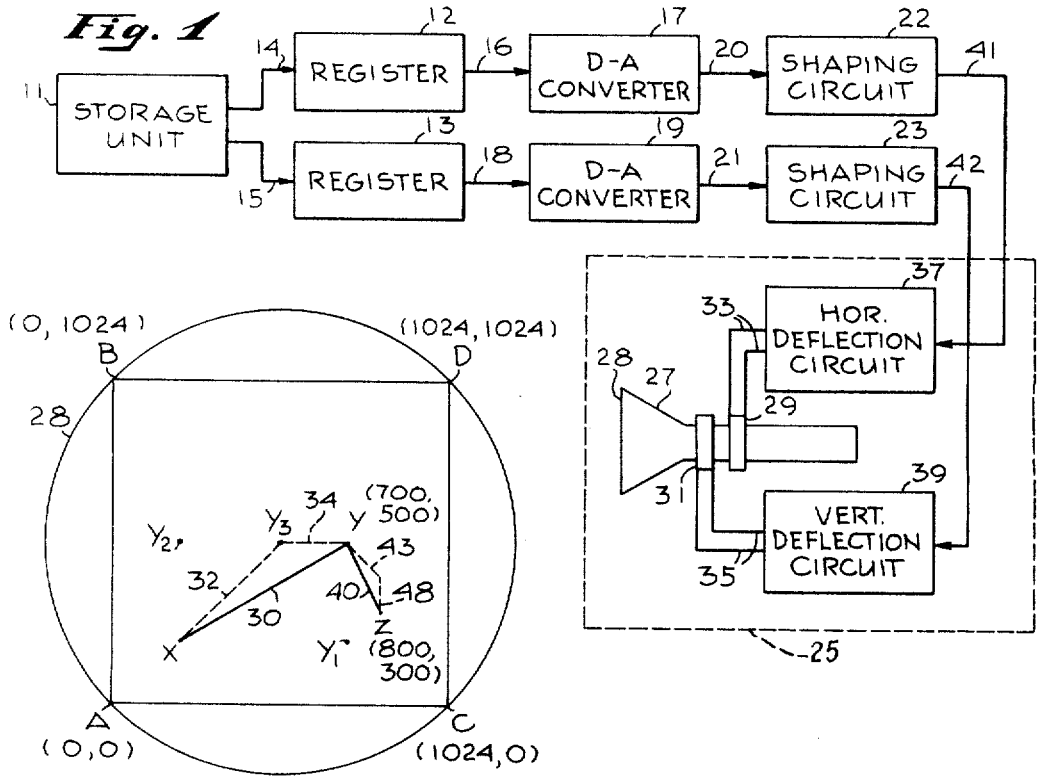
Fig. 1
Fig. 2
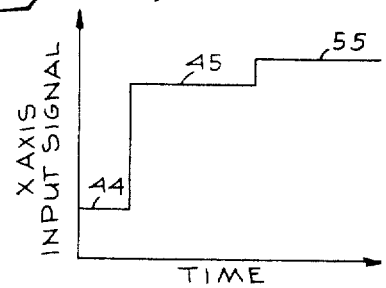
Fig. 3(a)
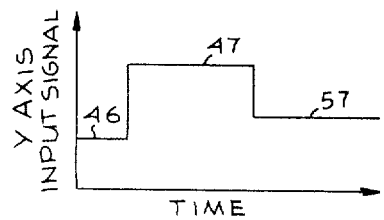
Fig. 3(b)
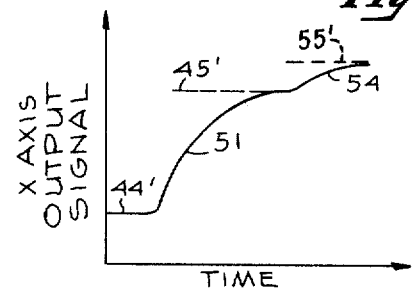
Fig. 3(c)
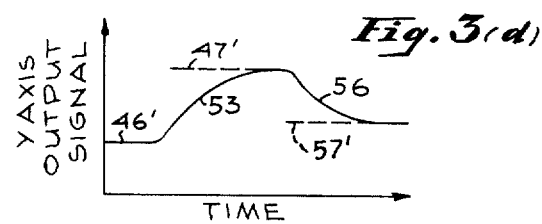
Fig. 3(d)
INVENTOR.
MARTIN C. HENDERSON
BY
Allen M. Sutton
ATTORNEY

MARTIN C. HENDERSON
INVENTOR.

BY Allen M. Sutton
ATTORNEY

MARTIN C. HENDERSON
INVENTOR.

BY Allen M. Sutton

ATTORNEY

United States Patent Office 3,333,147
Patented July 25, 1967

3,333,147
LINE DRAWING SYSTEM
Martin C. Henderson, Los Angeles, Calif., assignor, by mesne assignments, to The Bunker-Ramo Corporation, Stamford, Conn., a corporation of Delaware
Filed July 31, 1963, Ser. No. 298,950
15 Claims. (Cl. 315—22)

This invention relates to line drawing systems and, more particularly, to an improved system for deflecting a scribing means along a straight line.

For many years data has been presented in the form of graphs, using various coordinate systems, to enable users to easily comprehend and evaluate the data. Such graphs have generally been laboriously constructed by hand. In recent years, however, with the advent of high speed computing equipment capable of providing tremendous amounts of data virtually instantaneously, efforts have been directed toward providing means for automatic plotting at high speed.

At present, various automatic plotters are commercially available. These machines are capable of sensing data supplied to them and converting such data to a graph composed of points which are then interconnected to form desired configurations. For example, X–Y plotters are but one type of machine for performing the described plotting operation. Another instrument used for display purposes is the cathode ray tube (CRT), which is similar to the well known television tube, wherein electrical signals cause an electron beam within the display tube to be deflected to different positions on a phosphor-coated display surface of the tube. It is possible to supply the display tube with electrical signals which are proportional to X and Y numerical values (in a rectangular coordinate system), so that the electron beam will be deflected to a point on the display surface having a horizontal displacement of X and a vertical displacement of Y with respect to predetermined lines of reference. Of course, by changing the electrical signals to be proportional to new numerical values X' and Y', the beam will be deflected to a second point as represented by the second set of coordinates. Such automatic point plotting technique is similarly well known in the electronic information display art.

Quite often, the desired automatically plotted configuration is to be composed of straight lines rather than single individual points and the plotting of straight lines has heretofore required complex electronic equipment which, despite its cost, does not maintain a high degree of plotting accuracy. The reason for such complexity become apparent when considering a straight line as composed of an infinite number of points between the two end points of the line. Of course, if sufficient electrical signals changing by infinitely small amounts are available, then it is possible to draw straight lines automatically with conventional cathode ray display tubes in a manner similar to the drawing of a series of individual points. However, such is not usually the case, and in fact, it is usually desired to limit the number of signals necessary to define and consequently plot a straight line. In manual operation, a draftsman needs only to know the end coordinates of a line and after locating the two end points a straightedge may be used to connect the two points to form the desired line. Such a simple technique of drawing a straight line by defining the two end coordinates only is highly desirable in automatic line drawing methods utilizing cathode ray tubes, since the number of electrical signals necessary to deflect the electron beam in a straight line will thus be held to a minimum. This is particularly true where the electrical signals are converted from digital numbers which have been prestored in a computer of a limited storage capacity, since the fewer the digital numbers necessary to define a straight line, the more lines may be stored in the computer's information stored section. However, past experience with available automatic drawing equipment using cathode ray tubes for display has shown that when deflecting the electron beam to a first point on its display surface defining one end point of the line, and then deflecting the beam by supplying signals representing the coordinates of the other end point of the line, the beam does not always move in a straight line between the two end coordinates, but rather tends to follow undesired courses between the two end points.

Accordingly, it is an object of the present invention to provide a system which greatly simplifies the equipment and circuitry necessary for automatic straight line drawing from digitally stored computer information.

It is another object of the present invention to provide a system which greatly simplifies the equipment and circuitry necessary for automatic straight line drawing from digital information representing only the end points of each line to be drawn.

Another disadvantage of some presently available automatic line drawing systems using cathode ray tubes as the display means is the variation of the optical intensity along a single drawn line and the further differences of optical intensities between lines of differing lengths. These optical intensity variations are caused by the varying rates of deflections of the electron beam as the beam is being deflected to trace out, in fixed periods of time, lines of varying lengths. Further, the rate of deflection of the electron beam varies even when tracing out a single line so that optical intensity variations exist thereon. Such variations are disturbing when a displaced configuration comprising several lines is visually observed on the display surface, and they are particularly undesirable when the displayed configuration is photographically reproduced or printed out, since the optical intensity differences cause marked changes in the photographic contrasts.

It is, therefore, a further object of the present invention to provide a system wherein means are provided for adjusting the intensity of the electron beam of a CRT, so that the apparent optical intensity of each straight line being drawn and the over-all optical intensity of a displayed configuration comprising several straight lines are maintained at substantially a constant level.

The present invention involves specially designed wave shaping circuits which are energized by analog input signals having step function waveforms which represent the two end points of a line to be drawn. The circuits shape the analog signals to provide deflection signals with the rates of change of the deflection signals being controlled so that a scriber (e.g. an electron beam in a cathode ray tube) is deflected in a straight line between its two end positions. The wave shaping circuits provide output signals whose amplitudes always change from one level to another in the same predetermined length of time regardless of the amount or direction of change. The present invention also utilizes signal comparison techniques which control the over-all optical intensity of each displayed line and the relative optical intensity of several lines comprising a single displayed configuration to make them substantially uniform.

A system embodying the present invention may incorporate a digital computer, wherein information defining the coordinates of the two end points of each line to be automatically drawn has been stored. Assume that, on command, the computer provides a set of two digital numbers which define the coordinates of one end of a given line. Each of the two numbers is then converted in a digital-to-analog converter to an analog or current signal, in a manner well known by those versed in the arts of computer operations and information display. The two signals may be utilized to energize the horizontal and vertical deflection circuits of a display tube such as a cathode ray tube, so that the electron beam of the tube is deflected and positioned at a point on the display surface which corresponds to the coordinates defined by the two digital numbers produced by the computer. When the computer produces a second set of two digital numbers, which define the coordinates of the other end of the line to be drawn, the digital-to-analog converters will produce two new analog signals which are related to the new set of digital numbers, the change in output signal of each converter being in the form of a step function, the height of the step depending on the difference between the numbers in the first and second sets of digital numbers supplied to the converter. If these output signals of the converters in the form of step functions were directly used to energize the horizontal and vertical deflection circuits of the display tube, the deflection circuits would become saturated, as will be explained hereafter, so that the electron beam would not move in a straight line between the two points defined by the two sets of end coordinates. Rather, the beam would first tend to be deflected from the point defined by the coordinates of the first set of signals by first forming a slope of forty-five degrees with both the horizontal and vertical axes of the display surface, and, after the horizontal or vertical component of the second set of end coordinates had been reached, the beam would tend to approach the point defined by the second set of coordinates in either a straight horizontal or vertical direction, so that two lines are drawn between the two sets of end coordinates rather than the single desired straight line.

However, apparatus embodying the present invention prevents the foregoing phenomenon from occurring by incorporating wave shaping circuits which modify the step or square wave output signals of the digital-to-analog converters to provide signals which are used to energize the horizontal and vertical deflection circuits of the display tube. The wave shaping circuits are so designed as to prevent the deflection circuits from saturating. The wave shaping circuits further control the input signals to both deflection circuits so that the ratios between step signal increments produced by the digital-to-analog converters and the corresponding deflection signal increments supplied to the deflection circuits are substantially equal at all times. By so controlling the deflection signals which energize the deflection circuits, the apparatus positions the electron beam of the display tube at a point on the display surface determined by a first set of digital numbers, and then causes the beam to deflect in a single straight line toward a second point defined by a second set of digital numbers.

In another embodiment of the present invention, the intensity of the electron beam, which controls the brightness of the visible display seen on the display surface of the cathode ray tube, is in turn controlled by the deflection circuits which cause the beam to be deflected across the display surface. Since every line in a configuration of lines is drawn in a fixed predetermined time period but the lines may differ in length, the beam will sweep across the display surface at varying rates, thereby causing variations in optical intensity of the various lines. However, by varying the beam intensity as a function of the rate of deflection of the beam, the present invention makes it possible to increase the intensity of the electron beam whenever the rate of deflection of the beam of the display tube increases. The coupling of the deflection circuits with the beam intensity control also corrects for small intensity variations of the beam as it sweeps across the display surface to provide a single line from digital information defining the line's two end coordinates.

The novel features which are believed to be characteristic of the invention, both as to the system and method of line drawing, together with further objects and advantages thereof, will be better understood from the following description taken in conjunction with the accompanying drawings, in which:

FIGURE 1 is a block diagram of one embodiment of the present invention;

FIG. 2 is a front view of a display apparatus that may be used to display line configurations automatically drawn according to the teaching of the invention;

Figure 4:
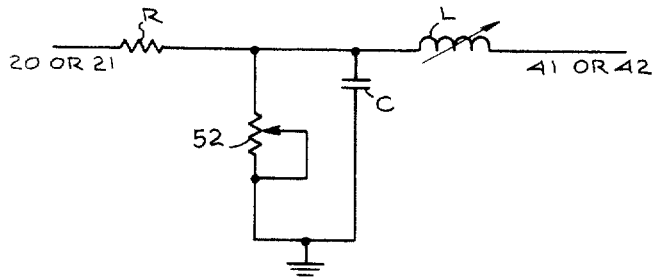
Figure 5:
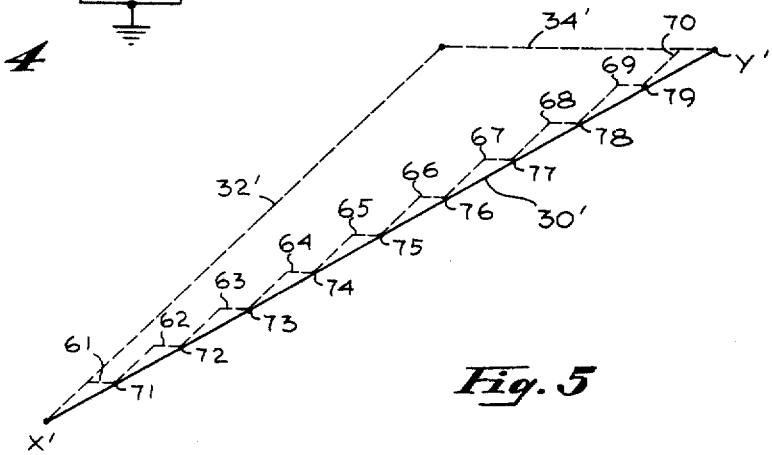
Figure 6:
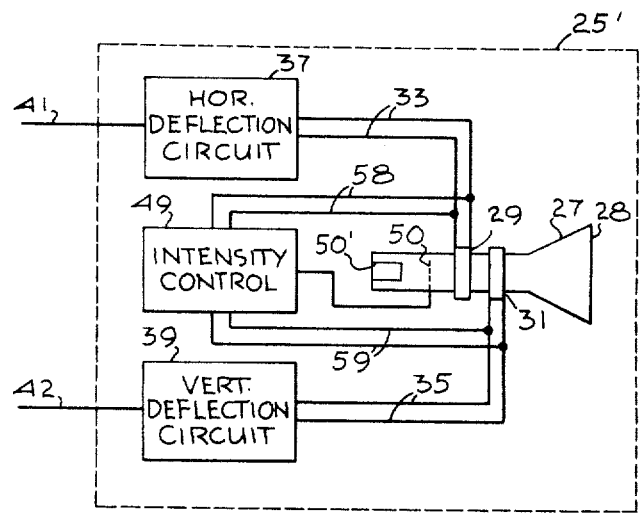
Figure 7:
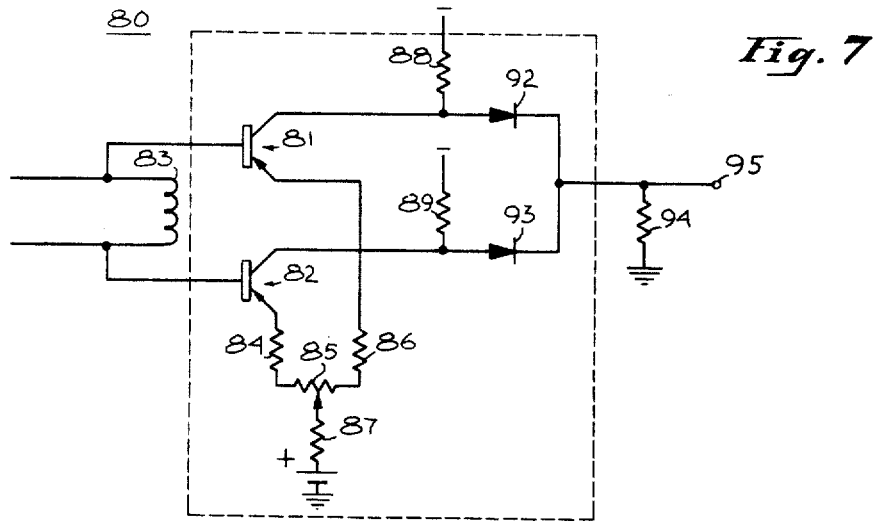
Figure 8A:
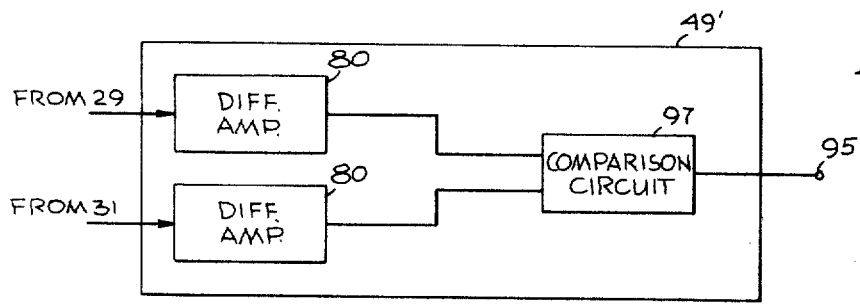
Figure 8B:
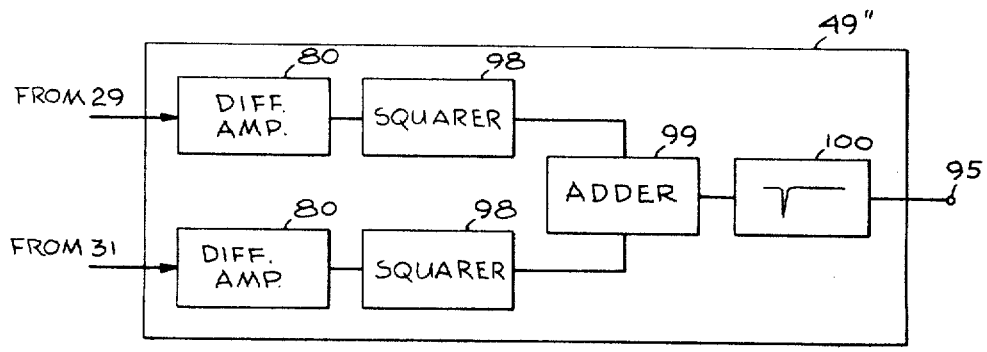

FIGS. 3(a), 3(b), 3(c), and 3(d) represent signal waveforms useful in understanding the method and system of the invention;

FIG. 4 is a schematic diagram of a wave shaping circuit incorporated in the invention;

FIG. 5 is a magnified representation of a line drawn by another embodiment of the invention;

FIG. 6 is a block diagram of another embodiment of the invention;

FIG. 7 is a schematic diagram of a beam intensity control that may be incorporated in the system shown in FIG. 6; and FIGS. 8(a) and 8(b) are block diagrams of different beam intensity control circuits used in other embodiments of the invention.

Referring now to the embodiment of the invention shown in FIG. 1, a digital storage unit 11 is connected to digital registers 12 and 13, through lines 14 and 15 respectively. The digital storage unit 11 may be a digital computer, but is not limited thereto, wherein the coordinates of the points of lines to be automatically drawn are stored in memory or storage sections. Any digital circuit operable to supply the registers 12 and 13 with digital numbers defining such coordinates may be employed as the storage unit 11. The digital registers 12 and 13 are of sufficient bit capacity to register the largest possible numbers that may have been stored in the storage circuit 11. For example, a ten bit register will suffice if the largest number to be registered therein does not exceed 1024. For explanatory purposes only, it will be assumed that ten bit registers are sufficient and that the digital numbers supplied to the registers 12 and 13 by storage circuit 11 represent the horizontal and vertical components, respectively, of the coordinates of end points of lines in a rectangular Cartesian coordinate system. The digital number representing the horizontal coordinate component of an end point of a line is in turn supplied by register 12 through line 16 to a conventional digital-to-analog converter 17, while the digital number representing the vertical coordinate component of the same end point is supplied by the register 13 through line 18 to another similar digital-to-analog converter 19. The outputs of the analog converters 17 and 19 in the form of voltage step functions, the heights of the steps being proportional to the changes of the energizing digital signals, are supplied through lines 20 and 21 to substantially identical wave shaping circuits 22 and 23, respectively.

A display system, generally designated by numeral 25, serves as the means for displaying the lines which are automatically drawn. The display system 25 comprises a display tube 27 (such as a cathode ray tube) with its associated circuitry which operates in a fashion similar to a television tube, having a viewing or display surface 28. Horizontal and vertical deflection coils, which serve to deflect an electronic beam within the tube 27, are designated by numerals 29 and 31, respectively, and are respectively connected by means of lines 33 and 35 to a horizontal deflection circuit 37 and to a vertical deflection circuit 39. The deflection circuit 37 is further connected to the wave shaping circuit 22 through line 41, while the deflecting circuit 39 is connected through line 42 to the wave shaping circuit 23. While electromagnetic deflection means are shown for purposes of illustration, it is to be understood that the display tube 27 might use electrostatic deflection means and the invention is not limited to one or the other.

The manner of operation of the system shown in FIG. 1 may best be explained by referring to FIGS. 2 and 3. In FIG. 2, a front view of the display surface 28 of the display tube 27 is diagrammatically shown. As it was previously assumed that the largest number in the system representing a coordinate component of a point to be drawn is 1024, it is further assumed that the display surface 28 is dimensionally large enough both in its horizontal and vertical dimensions to permit the electron beam of the tube to be deflected a distance which is proportional to that largest coordinate number. In FIG. 2, a point designated A represents a position on the surface to which the display beam is deflected if the digital content of the registers 12 and 13 is zero in both registers. Point B represents a zero digital number in the register 12 and a maximum digital number, namely 1024, in the register 13. Point C, on the other hand, represents a maximum digital number in the register 12 and a zero number in register 13. Point D, which is the further corner of a maximum square display surface, superimposed on the circular display surface 28, represents a point having maximum coordinate components in both the horizontal and vertical directions.

Let it be assumed that the storage unit 11 has first supplied two digital numbers, each being 200 and representing the coordinates of a first end point of a line, which in turn have caused the electron beam of the display tube 27 to be deflected to point X which is the first end point of a straight line 30 as shown in FIG. 2. The output levels of the converters 17 and 19 are designated as lines 44 and 46 as shown in FIGS. 3($a$) and 3($b$), respectively. Assume now that the storage unit 11 automatically supplies a new set of numbers, which represent the coordinates of the second end point of the straight line 30 which is to be automatically drawn, the number supplied by the storage unit 11 to the register 12 being 700, representing the horizontal component of the coordinates of the second end point of the line 30, and the number supplied to the register 13 being 500, representing the vertical component of the coordinates of the latter end point. The register 12 will energize the converter 17 so that its output will change to represent 700 as shown by line 45 in FIG. 3($a$). The register 13 will similarly energize the converter 18 so that its output signal will change to represent 500, as shown by line 47 in FIG. 3($b$).

The importance and function of the wave shaping circuits 22 and 23 can best be appreciated by considering the operation of the system in their absence. If the signals as represented by lines 45 and 47 in FIGS. 3($a$) and 3($b$), respectively, were directly supplied to the deflection circuits 37 and 39, the electron beam of the display tube 27 would not be deflected from point X to point Y along straight line 30, as shown in FIG. 2, but rather would follow a path as shown by dashed lines 32 and 34. Line 32 forms a forty-five degree angle with respect to both the horizontal and vertical axes of the coordinate system of the display surface. The reason for the electron beam of the display tube 27 following the indirect path of the lines 32 and 34 between the points X and Y can be explained by observing the step functions shown in FIGS. 3($a$) and 3($b$). As shown in FIG. 3($a$), the sudden change in the output signal of the converter 17 from level 44 to level 45 saturates the conventional deflection circuit 37 of the display tube so that the electron beam tends to be deflected in a straight horizontal direction towards point $Y_1$ of FIG. 2, having a horizontal coordinate component of 700. At the same time, the sudden change in the output signal of the converter 19 from the level 46 to level 47 saturates the conventional deflection circuit 39 so that the electron beam tends to be deflected in a straight vertical direction toward point $Y_2$ of FIG. 2, having a vertical coordinate component of 500. The electron beam which is simultaneously being subjected to forces tending to deflect it in both horizontal and vertical directions, chooses an intermediate path along line 32 which substantially forms a forty-five degree angle with both the horizontal and vertical axes. The electron beam continues to be deflected along line 32 forming a forty-five degree angle with both axes, until one of the coordinate components of the point towards which the beam ultimately tends to be deflected is reached. The electron beam then follows either a direct horizontal or vertical deflection course toward the end point. In the example shown, the vertical coordinate component of point Y, namely 500, is reached at point $Y_3$, so that from $Y_3$ towards ultimate point Y the beam is deflected in a horizontal direction along dashed line 34.

A similar phenomenon occurs when the output signal of the converter 17 increases to a level representing 800 and the output signal of the converter 19 drops to a level representing 300, both output signals representing a point Z having horizontal and vertical coordinate values of 800 and 300, respectively. The electron beam, instead of being deflected along line 40 as desired, will first be deflected along dotted line 43 and then move vertically downward along line 48 towards end point Z.

However, according to the teachings of the invention, the waveforms of the output signals of the converters 17 and 19 are shaped in the wave shaping circuits 22 and 23 so that the signals energizing the deflecting circuits 37 and 39 do not saturate those circuits, but rather control the deflection signals so that the electron beam is deflected in direct straight paths between the end point X and Y, as indicated by line 30 (FIG. 2) and between the end points Y and Z, as indicated by line 40.

In one embodiment of the present invention, the wave shaping circuits 22 and 23 employ resistance-inductance-capacitance type passive networks which shape the step function output signals of the converters 17 and 19, to provide signals having waveforms similar to those shown in FIGS. 3($c$) and 3($d$). The step-up in the output signal of the converter 17 from line 44 to line 45 as shown in FIG. 3($a$) is shaped in the wave shaping circuit 22 so that the change in the amplitude of the output signal of the wave shaping circuit is gradual, following a rate of amplitude change pattern diagrammed by line 51 of FIG. 3($c$), which is a typical output waveform of a passive resistance-inductance capacitance (R-L-C) network in response to an input step function signal, as is well known in the field of network theory. The advantages of such a wave shaped signal in automatic line drawing equipment may best be realized by carefully observing the shape of the waveform represented by line 51 of FIG. 3($c$). The waveform of the output signal of the wave shaping circuit 22 initially changes gradually as the input signal to the circuit changes from one level to another, as represented by lines 44 and 45 in FIG. 3($a$). Then, the rate of change of the output signal of the circuit 22 increases, which tends to increase the rate of deflection of the electron beam towards the point having a horizontal coordinate component represented by a line 45'. Finally, the rate of change of the output signal decreases again and the signal approaches the level of line 45'.

FIG. 4 is a schematic representation of a type of resistance-inductance-capacitance passive network which may be employed as the wave shaping circuit 22 or 23. A resistor R, which is connected to one of the converters 17 or 19 through lines 20 or 21, is serially connected to a variable inductor L which is in turn connected to one of the deflection circuits 37 or 39 by means of the lines 41 or 42. A parallel combination of a capacitor C and a variable resistor 52 is connected between the junction of the resistor R and inductance L and another terminal common to the entire system and indicated as ground. The values of the resistor R, the capacitor C and the inductor L are chosen to complement the performance of the rest of the system, and the position of the movable arm of variable resistor 52 is chosen to critically damp the circuit so that the waveform shown as line 51 (FIG. 3($c$)) reaches an amplitude level indicated by line 45' as soon as possible and without exceeding that level. Such critical damping insures that the deflected electron beam reaches the desired end point of the line being drawn as soon as possible.

The step function shown in FIG. 3(b) wherein the output signal of the converter 19 is shown as changing levels indicated by lines 46 and 47, is shaped in the wave shaping circuit 23 as indicated by a line 53 of FIG. 3(d). Similarly, the line 40 having end point coordinates Y and Z, as shown in FIG. 2, is drawn by wave shaping the step functions shown by lines 45 and 55 of FIG. 3(a) and by lines 47 and 57 of FIG. 3(b), to output signals having waveform shapes as shown by lines 54 and 56 of FIGS. 3(c) and 3(d), respectively.

One of the more important features of the invention is that the rise or fall times of the output signals of the wave shaping circuits are essentially the same for all step input signals regardless of the amplitudes of the steps. Therefore, as seen in FIGS. 3(c) and 3(d), the rise and fall times of the waveforms 51, 53, 54 and 56 are substantially identical even though the amplitude changes are different. The ratios between the input step voltage increments and the output voltage increments are substantially equal at all times. Were it otherwise, straight lines would not be drawn on the display surface. The predetermined length of time that it takes the output voltage to change from one level to another is, of course, a function of the circuit constants, which will vary from one application to another. The wave shaping circuits 22 and 23, which have been shown and described as consisting of critically damped R–L–C passive networks, are a preferred embodiment of the invention. However, other means for performing the same function may be utilized.

In another embodiment of the present invention, the wave shaping circuits 22 and 23 comprise analog computing circuits. Each analog computing circuit is programmed to receive an input signal and compare its amplitude with that of a previously supplied input signal. The difference between the two signals is divided by a predetermined number. Multiples of the quotient are then supplied as input signals to the display unit 25, the first input signal being equal to the quotient and each succeeding input signal being greater than the previous input signal by a value substantially equal to the quotient. By so energizing the display circuit 25, the electron beam will not be deflected along a perfectly straight line between points X and Y of FIG. 2 but rather will move in small step-like paths, the paths not deviating appreciably from the line 30 of FIG. 1.

The path that the electron beam will follow in response to energizing signals from the two computers, programmed as described, is shown in FIG. 5, wherein line 30' is similar to line 30 of FIG. 2 except that it is shown on a larger scale. Although the output signals of the computers are similar in form to the step functions shown in FIGS. 3(a), 3(b) they differ therefrom in amplitude and in the period of each step by a factor equal to the predetermined number which divides the difference between two consecutive input signals in each computer. In FIG. 5, for example, the predetermined dividing number is 10, so that the beam is deflected along a path marked by devitations 61–70 rather than along lines 32' and 34' as previously described. It is clear that by increasing the divisors in the computers, more than ten steps may be formed, so that even though the beam is not deflected in a perfectly straight line between its end points, it nevertheless follows a path which is substantially straight, each path deviation being so small as to be visually unnoticeable.

In still another embodiment, the function of the computing circuits previously described is performed by the storage circuit 11 shown in FIG. 1 so that lines 20 and 21 may be directly coupled to lines 41 and 42, respectively. In this embodiment, the signals supplied by the storage circuit 11 do not represent only the coordinates of the end points of a line but further represent a predetermined number of points along the line as indicated by points 71 through 79 of FIG. 5, the number of points being preselected so that each drawn line seems straight between its end points.

As previously discussed, in display systems employing cathode ray display tubes, the optical intensity of the generated lines on the display surface of the tube varies within each line drawn, and between several drawn lines. The cause of such variations can best be explained by referring to FIGS. 3(c) and 3(d). It is apparent, when observing a display surface on which lines are drawn, that the optical intensity of the visual display is directly related to the rate at which the electron beam within the tube is deflected across the display surface. The higher the rate of deflection of the beam, the less optically intense is the display. From observing lines 51 and 53 in FIGS. 3(c) and 3(d), respectively, it is clear that the initial rate of beam deflection is small, gradually increasing to a high rate (steep slope), the rate of deflection finally decreasing again as the beam approaches the end point of the line. Thus, the line drawn by the electron beam will be brighter at its ends than in the middle. As previously noted, it is a requirement in drawing straight lines with a wave shaping circuit, such as shown in FIG. 4, that the rise or fall times of its output signals are substantially the same for all step input signals regardless of the amplitudes of the steps. Thus, as seen in FIGS. 3(c) and 3(d), the rise and fall times of the waveforms 51, 53, 54 and 56 are substantially identical. This means that the deflection rate of the electron beam in the display tube will be faster when drawing a long line than when drawing a short line. Hence, a short line will appear more intense than a long one.

A preferred embodiment of the invention incorporates a display system 25', shown in FIG. 6, in which undesirable optical intensity variations are substantially eliminated by using a beam intensity control circuit 49, which is connected to the deflection circuits 37 and 39 through lines 58 and 59, respectively, and to a control grid 50 of the display tube 27. As is well known by those familiar with cathode ray tubes, the intensity of the electron beam produced by an electron gun 50' in the tube is controlled by the voltage on the control grid of the tube. In the embodiment of the invention shown in FIG. 6, the control grid 50 of the tube is connected to the beam intensity control circuit 49, which controls the voltage on the grid as a function of the rate of change of current through the deflection coils 29 and 31 of the tube. As the rate of current flow in either or both deflection coils increases, thus causing the beam to be deflected across the display surface at a higher rate of speed, the beam intensity control circuit 49 correspondingly increases the voltage on the control grid 50, thus intensifying the electron beam and the visible display. The functional interrelationship of the beam intensity control circuit 49 and the display tube 27 insures substantially uniform optical intensity over each single drawn line and between several lines consecutively drawn to form a single display configuration.

Referring now to FIG. 7, there is shown a difference amplifier, generally designated by the numeral 80, two of which may be utilized to comprise the beam intensity control circuit 49. Since the two amplifiers are substantially identical, only one has been shown and will be described. As shown, the difference amplifier 80 comprises two PNP transistors 81 and 82 whose bases are respectively connected to opposite ends of a cathode ray tube deflection coil 83. The coil 83 represents either the horizontal deflection coil 29 or the vertical deflection coil 31, shown in FIG. 6. The emitters of the transistors 81 and 82 are connected together through a fixed resistor 84, a potentiometer 85 and a fixed resistor 86. The movable arm of the potentiometer 85 is connected through a resistor 87 to a positive potential source (not shown). The collectors of the transistors 81 and 82 are connected to a negative potential source (not shown) through resistors 88 and 89, respectively. Diodes 92 and 93 have their anodes respectively connected to the collectors of the transistors 81 and 82 and their cathodes connected to one end of a load resistor 94 and to a terminal 95. The terminal 95 may be connected to the intensity control grid 50 of the display tube (FIG. 6). The other end of the resistor 94 is grounded.

It is pointed out that the resistors 84 and 86 are of equal value, as are the resistors 88 and 89. The arm of the potentiometer is set to balance the circuit, so that as long as the voltage drop across the coil 83 is negligible, both transistors are equally biased and no current is flowing through either diode 92, 93. However, as the rate of change of current in the coil 83 increases, resulting in a greater rate of deflection of the CRT electron beam, the voltage levels of the bases of the two transistors differ, because the voltage drop across the coil equals its inductance times the rate of change of current therethrough. This results in varying the conduction of the two transistors, so that current flows through one of the two diodes depending on the direction of the change of current in the coil 83, and through the resistor 94. The magnitude of the voltage drop across the resistor 94, which is connected through the terminal 95 to the intensity control grid of the CRT, increases the optical intensity of the displayed lines drawn by the deflected beam. Similarly, if the rate of change of beam deflection decreases, the voltage drop across the resistor 94 decreases to reduce the CRT beam intensity.

The difference amplifier 80 of FIG. 7, wherein the rate of change of current in the deflection coil 83 controls the potential of the intensity control grid of the CRT, is shown for explanatory purposes only. It is clear that other electronic components such as NPN transistors or vacuum tubes and rectifying means may be used in various circuitry arrangements in order to accomplish the controlling effect described. In addition, although the deflection coil 83 is shown, the circuitry may easily be modified by one skilled in the art to operate with electrostatic deflection plates. Therefore, all such combinations are deemed to be within the scope of the present invention.

It is to be noted that, since the optical intensity of the displayed line may vary as a function of the rate of deflection of the electron beam in either a horizontal or vertical direction, the beam intensity control 49, shown in FIG. 6, comprises two difference amplifiers similar to the amplifier 80 shown in FIG. 7 and as identical to each other as possible. One amplifier is connected to the vertical deflection coil 31, while the other difference amplifier is connected to the horizontal deflection coil 29. The outputs of both difference amplifiers are connected to the resistor 94 (FIG. 7), so that the CRT control grid connected to the terminal 95 is controlled by the rate of deflection of the electron beam in both the horizontal and vertical directions.

In another embodiment of the invention, the magnitudes of the output signals of the difference amplifiers within the beam intensity control circuit are compared and only the larger of the two signals is used to control the potential of the intensity control grid of the display tube. In still another embodiment, the intensity control grid of the CRT is controlled by a signal having an amplitude which is the root-mean square (RMS) of the output signals of the difference amplifiers within the beam intensity control circuit. Techniques for the selection of a greater of two signals or for electronically generating an RMS signal of two separate signals are well known to those versed in the art of electronic circuit design. Therefore, the diagrams of FIGS. 8(a) and 8(b) represent in block form the general implementation of the two last-mentioned embodiments of the invention.

In FIG. 8(a), the beam intensity control circuit, which is generally designated by numeral 49', comprises two difference amplifiers 80 which are connected to derive input signals from either the horizontal or the vertical deflection coils of the display tube, as described hereinbefore. The output signals of the two difference amplifiers are in turn connected to a comparison circuit 97, wherein the two output signals are compared and only the larger of the two signals is used as the output signal at terminal 95. The circuit shown in FIG. 8(b) operates in substantially the same manner, except that the comparison circuit 97 of FIG. 8(a) is replaced by a root-mean-square circuit comprising two squaring means 98, adding means 99 and means 100 for taking square roots. The squaring means 98 square the output signals from the difference amplifiers 80 and supply the squared signals to adding means 99 where they are added together. They are then supplied to the means 100 which takes their square root and provides it to the terminal 95 to be connected to the control grid of the display tube 27 in order to accurately control the optical intensity of the displayed lines.

From the foregoing description, it is now apparent that the present invention provides an improved method and system for automatically displaying lines on a display surface, the display surface of a cathode ray tube being one example of such surface, from signals derived from digital information representing the coordinates of the end points of the displayed lines which are substantially straight between their end points. Although embodiments of the invention utilizing cathode ray tubes have been shown and described, it will be appreciated that the invention is not so limited, but may be utilized to provide smoothly changing control signals to other devices.

The invention also provides a method and means for maintaining the over-all optical intensities of the lines at a uniform level, which is satisfactory for visual observation of the lines or for their photographic reproduction.

It is understood that many changes and modifications may be made by one skilled in the art without departing from the true spirit and scope of the invention.

The embodiments of the invention in which an exclusive property or privilege is claimed are defined as follows:

1. In a system for drawing a substantially straight line between two end points in a plural coordinate system, said end points with respect to first and second coordinates being respectively represented by first and second step function electrical signals, the improvement comprising:

shaping means connected to receive said first and second magnitude independent step function signals and provide corresponding first and second output signals whose amplitudes change from level to level in accordance with said step function signals in a same predetermined length of time regardless of the amplitude of the signal level change, said shaping means comprising two substantially identical, critically damped, resistance-inductance-capacitance networks.

2. In a system for drawing a substantially straight line between two end points in a plural coordinate system, the end points with respect to first and second coordinates being respectively represented by first and second, substantially magnitude independent, step function electrical signals having increments respectively representing changes in said first and second coordinates, the improvement comprising:

means connected to receive said first and second step function signals and provide corresponding first and second output signals whose amplitudes change gradually by amounts corresponding to the increments in said step function signals, ratios between said first and second step function signal increments and corresponding first and second output signal amplitudes being substantially equal at all times, said means comprising two substantially identical, critically damped, resistance-inductance-capacitance networks.

3. A system for displaying a substantially straight line between two end points in a plural coordinate system comprising:
- means for providing digital signals representing said end points with respect to first and second coordinates;
- converter means for receiving said digital signals and providing first and second step function electrical signals respectively representing first and second coordinates of said end points;
- shaping means connected to receive said first and second step function signals and provide corresponding first and second output signals whose amplitudes change from level to level in accordance with said step function signals in a same predetermined length of time regardless of the amplitude of the signal level change; and
- display means connected to receive said first and second output signals for displaying a line drawn in accordance therewith.

4. The improvement defined by claim 3, wherein said shaping means comprise two substantially identical, critically damped, resistance-inductance-capacitance networks.

5. A system for displaying a substantially straight line between two end points in a plural coordinate system comprising:
- means for providing digital signals representing said end points with respect to first and second coordinates;
- converter means for receiving said digital signals and providing first and second magnitude independent step function electrical signals having increments respectively representing changes with respect to said first and second coordinates;
- shaping means connected to receive said first and second step function signals and provide corresponding first and second output signals whose amplitudes change gradually by amounts corresponding to the increments in said step function signals, ratios between said first and second step function signal increments and corresponding first and second output signal amplitudes being substantially equal at all times, said shaping means comprising two substantially identical, critically damped, resistance-inductance-capacitance networks; and
- display means connected to receive said first and second output signals for displaying a line drawn in accordance therewith.

6. In apparatus having electron beam forming means, intensity control means for controlling intensity of an electron beam formed by said beam forming means, and vertical and horizontal deflection control means for controlling vertical and horizontal deflection of said electron beam, the improvement comprising:
- means connected to said vertical and horizontal deflection control means for providing two signals which vary substantially in proportion to rates of change of output of said vertical and horizontal deflection control means, respectively;
- means connected to receive said two signals for comparing said two signals and providing an output signal corresponding to the larger of said two signals; and
- means for connecting said output signal to said intensity control means, whereby the intensity of said electron beam is varied substantially in proportion to the rate of deflection of said beam.

7. In apparatus having electron beam forming means, intensity control means for controlling intensity of an electron beam formed by said forming means, and electromagnetic deflection control means for controlling vertical and horizontal deflection of said beam and including vertical deflection coil means and horizontal deflection coil means, the improvement comprising:
- means coupled to said vertical deflection coil means and responsive to voltage drop thereacross for providing a first signal substantially proportional to that voltage drop;
- means coupled to said horizontal deflection coil means and responsive to voltage drop thereacross for providing a second signal substantially proportional to that voltage drop;
- means connected to receive said signals for comparing said signals and providing an output signal corresponding to the larger of said signals; and
- means for connecting said output signal to said intensity control means, whereby the intensity of said electron beam is varied substantially in proportion to the rate of deflection of said beam.

8. A system for displaying a substantially straight line between two end points in a plural coordinate system comprising:
- means for providing digital signals representing said end points with respect to first and second coordinates;
- converter means for receiving said digital signals and providing first and second step function electrical signals respectively representing first and second coordinates of said end points;
- shaping means connected to receive said first and second step function signals and provide corresponding first and second output signals whose amplitudes change from level to level in accordance with said step function signals in a same predetermined length of time regardless of the amplitude of the change;
- display means having electron beam forming means, intensity control means for controlling intensity of an electron beam formed by said beam forming means, and vertical and horizontal deflection control means for respectively controlling vertical and horizontal deflection of said electron beam;
- means for connecting said first and second output signals to said vertical and horizontal deflection control means, respectively;
- means coupled to said vertical and horizontal deflection control means for providing two control signals which vary substantially in proportion to rates of change of output of said vertical and horizontal deflection control means, respectively; and
- means for coupling at least one of said control signals to said intensity control means, whereby the intensity of said electron beam is varied substantially in proportion to the rate of deflection of said beam.

9. The system defined by claim 8, wherein said shaping means comprise two substantially identical, critically damped, resistance-inductance-capacitance networks.

10. The system defined by claim 8, wherein both of said control signals are coupled to said intensity control means.

11. A system for displaying a substantially straight line between two end points in a plural coordinate system comprising:
- means for providing digital signals representing said end points with respect to first and second coordinates;
- converter means for receiving said digital signals and providing first and second step function electrical signals having increments respectively representing changes with respect to said first and second coordinates;
- shaping means connected to receive said first and second step function signals and provide corresponding first and second output signals whose amplitudes change gradually by amounts corresponding to the increments in said step function signals, ratios between said first and second step function signal increments and corresponding first and second output signal amplitudes being substantially equal at all times;

display means having electron beam forming means, intensity control means for controlling intensity of an electron beam formed by said forming means, and electromagnetic deflection control means for controlling vertical and horizontal deflection of said beam and including vertical deflection coil means and horizontal deflection coil means;

means for connecting said first and second output signals to said electromagnetic deflection control means;

means coupled to said vertical deflection coil means and responsive to voltage drop thereacross for providing a first control signal substantially proportional to that voltage drop;

means coupled to said horizontal deflection coil means and responsive to voltage drop thereacross for providing a second control signal substantially proportional to that voltage drop; and means for coupling at least one of said control signals to said intensity control means, whereby the intensity of said electron beam is varied substantially in proportion to the rate of deflection of said beam.

12. The improvement defined by claim 11, wherein said shaping means comprise two substantially identical, critically damped, resistance-inductance-capacitance networks.

13. In a system for displaying a substantially straight line on a visual display surface, the combination of:

electrical signal responsive means for positioning a visible spot at discrete positions on the display surface in response to the combination of a first electrical signal representing data defining the spot position in respect of a first coordinate of a rectangular coordinate system and a second electrical signal representing data defining the spot position in respect of the second coordinate of said rectangular coordinate system;

digital data storage means storing data representing the rectangular coordinates of both the point of beginning and the terminus of a given line to be displayed on said display surface;

first means coupled to said storage means for developing a first fixed two-level step function electrical signal, the magnitude of one level of which represents the point of beginning and the magnitude of the other level of which represents the terminus of said given line in respect of one of said rectangular coordinates;

second means coupled to said storage means for developing a second fixed two-level step function electrical signal having levels which are at least in part independent of said first electrical signal, the magnitude of one level of which represents the point of beginning and the magnitude of the other level of which represents the terminus of said given line in respect of the other of said rectangular coordinates;

said electrical responsive means including circuit means responsive to said first and second electrical signals for movably positioning said spot in respect of each coordinate from said point of beginning to said terminus during the same time interval independently of the difference in the magnitudes of the levels comprising either of said signals to visually define said given line.

14. A system according to claim 13 wherein said circuit means comprises first and second circuits each active upon a different one of said signals to effect movement of said spot from one position to another in the same interval of time, which interval of time is substantially greater than the time interval between the first and second levels of each signal.

15. Apparatus for use in combination with a scriber deflection means for deflecting a scriber along a substantially straight line between a first point defined by first horizontal and vertical analog signal levels and a second point defined by second horizontal and vertical analog signal levels, said apparatus including:

a first waveshaping means responsive to a transition in an input signal level applied thereto for producing an output signal level transition of a predetermined duration;

a second waveshaping means responsive to a transition in an input signal level applied thereto for producing an output signal level transition of the same predetermined duration produced by said first waveshaping means;

means for successively applying said first and second horizontal analog signal levels to said first waveshaping means; and means for successively applying said first and second vertical analog signal levels to said second waveshaping means.

References Cited

UNITED STATES PATENTS

| | | | |
|---|---|---|---|
| 2,766,444 | 10/1956 | Sheftelman | 340—318 |
| 2,860,284 | 11/1958 | McKim | 315—22 |
| 2,873,405 | 2/1959 | Iwerks | 315—22 |
| 3,004,187 | 10/1961 | Olson | 315—22 |
| 3,205,488 | 9/1965 | Lumpkin | 340—324 |

JOHN W. CALDWELL, *Acting Primary Examiner.*

DAVID G. REDINBAUGH, *Examiner.*

T. A. GALLAGHER, J. A. O'BRIEN,
*Assistant Examiners.*